(12) United States Patent
Wang et al.

(10) Patent No.: US 6,817,019 B1
(45) Date of Patent: *Nov. 9, 2004

(54) TRACKING AND PROPAGATING UPDATES TO A MESSAGE-DRIVEN SYSTEM OF INTERDEPENDENT COMPONENTS

(75) Inventors: I-Shin Andy Wang, San Jose, CA (US); Jy-Jine James Lin, Cupertino, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 613 days.

(21) Appl. No.: 08/655,879

(22) Filed: May 31, 1996

(51) Int. Cl.[7] .................................................. G06F 9/00
(52) U.S. Cl. ...................................................... 719/318
(58) Field of Search ................................ 395/672, 670, 395/683, 712, 188.01, 200.32, 200.78; 709/102, 100, 300, 303, 318, 310

(56) References Cited

U.S. PATENT DOCUMENTS

| | | | | |
|---|---|---|---|---|
| 4,799,141 A | * | 1/1989 | Drusinsky et al. | 364/141 |
| 4,860,204 A | * | 8/1989 | Gendron et al. | 364/300 |
| 4,905,181 A | * | 2/1990 | Gregory | 364/900 |
| 5,220,668 A | * | 6/1993 | Bullis | 395/650 |
| 5,329,626 A | * | 7/1994 | Klein et al. | 395/375 |
| 5,390,328 A | * | 2/1995 | Frey et al. | 395/650 |
| 5,414,833 A | * | 5/1995 | Hershey et al. | 395/575 |
| 5,455,953 A | * | 10/1995 | Rusell | 395/739 |
| 5,471,629 A | * | 11/1995 | Risch | 395/800 |
| 5,499,364 A | * | 3/1996 | Klein et al. | 395/200.03 |
| 5,504,896 A | * | 4/1996 | Schell et al. | 395/650 |
| 5,530,864 A | * | 6/1996 | Matheny et al. | 395/700 |
| 5,611,048 A | * | 3/1997 | Jacobs et al. | 395/220.09 |
| 5,648,950 A | * | 7/1997 | Takeda et al. | 395/187.01 |
| 5,713,045 A | * | 1/1998 | Berdahl | 395/893 |
| 5,721,920 A | * | 2/1998 | Mak et al. | 395/672 |

* cited by examiner

Primary Examiner—Sue Lao
(74) Attorney, Agent, or Firm—Gates & Cooper LLP

(57) ABSTRACT

The present invention discloses a method, apparatus, and article of manufacture for tracking and propagating state changes in a message-driven computer program. In accordance with the present invention, a program in the memory of a computer receives a notification signal indicating that an event has occurred and transitions a first component from a current state to a new state based on the notification signal, wherein the states are represented by discrete objects or components. The computer program propagates, to a second component subordinate to a first component representing the new state, a signal indicating the new state of the first component.

12 Claims, 4 Drawing Sheets

TRACKING AND PROPAGATING UPDATES TO A MESSAGE-DRIVEN SYSTEM OF INTERDEPENDENT COMPONENTS

BACKGROUND OF THE INVENTION

1. Field of the Invention

This invention relates in general to message driven systems, and in particular to track and propagate updates to a message driven system with interdependent components.

2. Description of Related Art

In a message-driven system, the state of a component or object may depend on the state of several other components or objects. However, the state of a dependent component or object should not be changed until its corresponding access message is to be received, i.e., the update propagation needs to be delayed. Thus, there is a need in the art for a systematic way to track and propagate updates to dependent components in a message driven system.

SUMMARY OF THE INVENTION

To overcome the limitations in the prior art described above, and to overcome other limitations that will become apparent upon reading and understanding the present specification, the present invention discloses a method, apparatus, and article of manufacture for tracking and propagating updates in a message-driven computer program. In accordance with the present invention, a program in the memory of a computer receives a notification signal indicating that an event has occurred and transitions from a current state to a new state based on the notification signal, wherein the states are represented by discrete objects or components. The computer program propagates, to a second component subordinate to a first component representing the new state, a signal indicating the new state of the first component.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention provides a method for tracking and delaying the update propagation in a relational network that mirrors the component relationship. The method requires no restriction on the component relationship, i.e., it could be a tree, graph, network, etc. A component may be a guardian, such that the state of other components depends on its state, a dependent, such that its state depends on the state of other components, or both. When an access message is received, the corresponding message handler of a component checks the updates based on the relationship with its dependency components. The message handler of the component applies the update and forwards its own updates to its dependent components.

Hardware Environment

Figure 1:
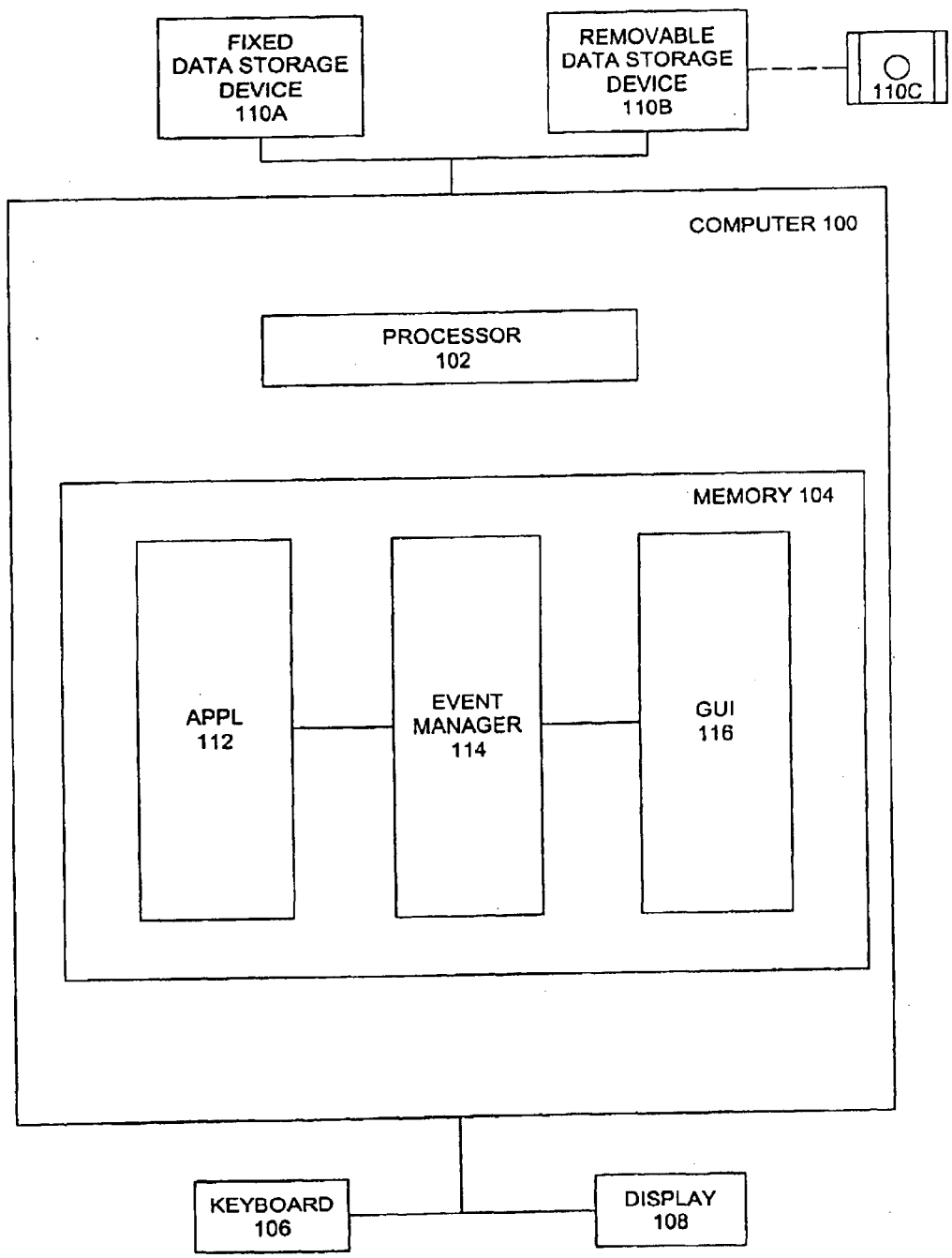
FIG. 1 is a block diagram illustrating an exemplary hardware environment used to implement the preferred embodiment of the invention.

FIG. 1 is a block diagram illustrating an exemplary hardware environment of the present invention. The present invention is typically implemented using a computer 100 comprised of a processor 102 and memory 104. It is envisioned that attached to the computer 100 may be a keyboard 106, display 108, and data storage devices 110a–c, such as fixed data storage devices 110a, removable data storage devices 110b, and media therefore 110c. The computer 100 operates under the control of an event manager 114.

The present invention is preferably implemented using an application program 112, an event manager 114, and a graphical user interface (GUI) 116. Generally, the application program 112, the event manager 114, and the graphical user interface program 116 are tangibly embodied in a computer-readable medium, e.g. one or more of the fixed and/or removable data storage devices 110a–b and/or media 110c. The application program 112, the event manager 114, and the graphical user interface program 116 may be loaded from the data storage devices and media 110a–c into the memory 104 of the computer 100. The application program 112, the event manager 114, and the graphical user interface program 116 all comprise instructions which, when read and executed by the computer 100, causes the computer 100 to perform the steps necessary to execute the steps or elements of the present invention.

Those skilled in the art will recognize many modifications may be made to this configuration without departing from the scope of the present invention.

Update Tracking and Propagation

Figure 2:
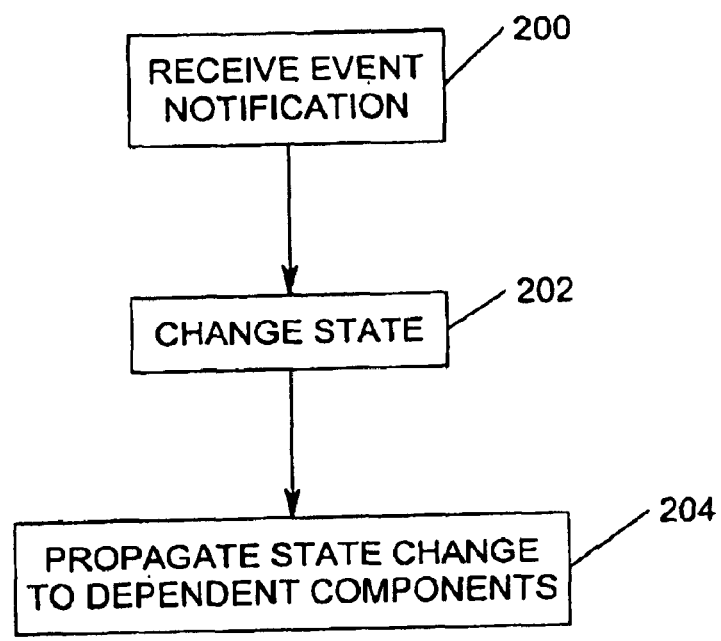
FIG. 2 is a flow chart illustrating the steps performed in this invention.

FIG. 2 is a flow chart illustrating the steps performed in this invention. Block 200 represents the computer 100 receiving an event notification signal. The event notification may be a user input from the GUI 116. Block 202 represents a first component in the application program 112 transitioning to a new state in the memory 104 of the computer 100 in response to receiving the notification signal. Block 204 represents the computer 100 propagating, from the first component to a second component, a notification signal indicating the new state of the first component, wherein the state of the second component is dependent on the state of the first component.

Figure 3:
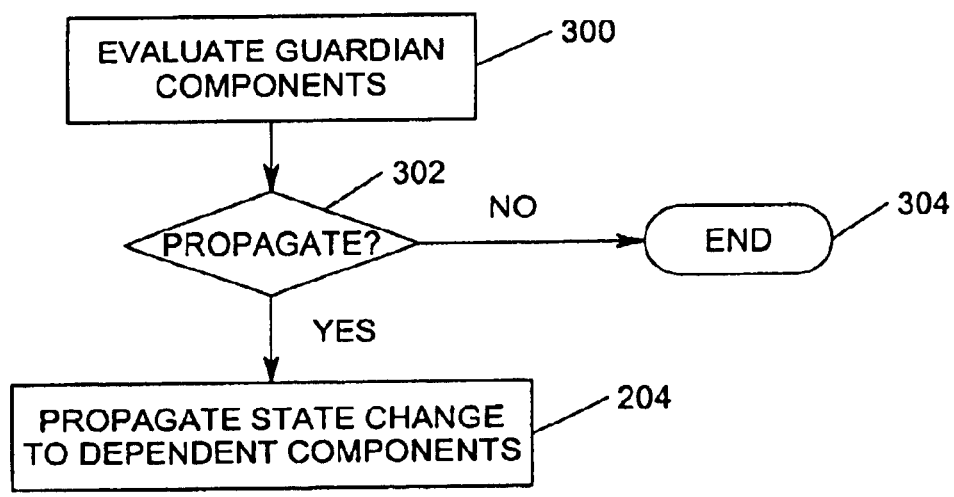
FIG. 3 is a flow chart illustrating the steps performed in an alternative embodiment of the propagate state change step of this invention.

FIG. 3 is a flow chart illustrating the steps performed by the computer 100 in an alternative embodiment of the propagate state change step of this invention. Block 300 represents the computer 100 evaluating the state of a third component, wherein the first component is dependent on the state of the third component. Block 302 is a decision block that represents the computer 100 determining whether the state of the third component indicates that the first component should propagate its state change to its dependent components. If so, control transfers to Block 204 which represents the computer 100 propagating, from the first component to a second component, a notification signal indicating the new state of the first component; otherwise, control transfers to Block 304 which represents the computer 100 not propagating the state change of the first component to its dependent components.

Figure 4:
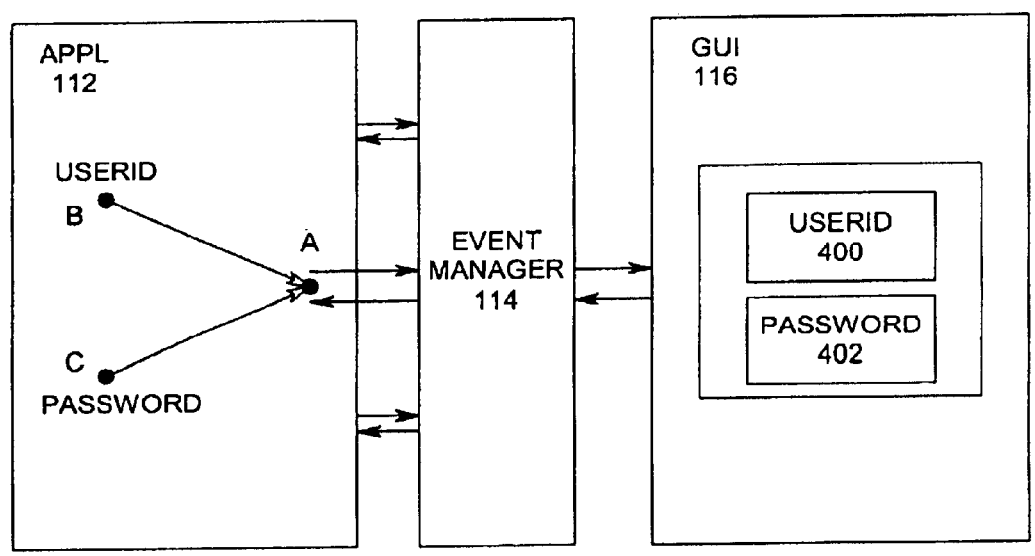
FIG. 4 is a block diagram illustrating the internal structure of a system according to the present invention.

FIG. 4 is a block diagram illustrating the internal structure of the application program 112 that interfaces to the event manager 114 and finally to a GUI 116 that displays information for an operator. In the application program 112, there may be a number of different states represented as components or objects represented in FIG. 3 as A, B, and C. In a particular instance of this example, the GUI 116 includes fields 400 and 402, respectively, for entering a user ID and password. These events trigger communication through the event manager 114 to the application program 112. Internally to the application program 112, the events are mapped into states within the application. For example, B may be a user ID state and C may be a password state.

Event driven systems are very different from non-event driven systems. For example, if component B in a non-event driven system was changed, then components that were dependent on B, such as component A, could be changed as well. In an event driven system, such actions can not take place because the operator is not expecting to be in that state yet, and thus component A cannot be changed except in response to the appropriate inputs from the operator. The components A, B, and C of the application program 112 illustrate a dependent relationship wherein component A is dependent on component B for the user ID and component C for the password, so that until the user ID and password have been entered by an operator, a transition to state A can not occur.

In this example, as soon as the user ID is entered component B sets its state to 1. Originally, components B and C both had a state of 0, as does component A. Later on, component C will also change its state to 1 when a password is entered by the operator. Component A is dependent on both component B and C and so when both components B and C change their state to 1, component A can also change its state to 1.

After component B sets its state to 1, component B propagates a message to component A indicating that component B's state is now 1. This message may set a flag in component A indicating that component B's state is now 1. A similar flag is set in component A when component C propagates a message to component A indicating that component C's state is now 1. Each dependent component of B receives a message from B indicating that B's state is now 1.

In an alternative embodiment, a dependent component provides a queue to store propagated messages. For example, at time t=0, the GUI 116 may provide a notification signal to component B within the application program 112 indicating that the userID has changed. Component B changes state from 0 to 1 and propagates a message to its dependent component A indicating its state has changed. At time t=1, the GUI 116 may provide a second notification signal to component B indicating that the userID has changed. If component A does not change state in response to the first notification signal until t=2, component B's flag will already be set to 1 when the second notification signal arrives, and thus the second notification signal will be ignored. The present invention provides a queue for storing subsequent messages to a dependent component indicating that the state of its guardian has changed. The dependent component can then process the messages according to the system requirements, such as FIFO or LIFO.

In another embodiment of the invention, the guardian component may not always propagate its state change to its dependent components. Since a component can be both a guardian and a dependent, a guardian component evaluates the states of its guardian components upon receiving a notification signal from the GUI 116 indicating that it should change state. Depending on the states of its guardians, the guardian may change state, but then delay propagating its state change to its dependent components.

Of course, the dependencies can be cyclical in that not only is component A dependent on the states of components B and C, for example, but component C could be dependent on the state of component A.

Conclusion

This concludes the description of the preferred embodiment of the invention. The following describe some alternative embodiments for accomplishing the present invention. The present invention may be implemented in any type of computer, such as a mainframe, minicomputer, or personal computer. Moreover, the present invention is not limited to a particular programming language, but extends to any method of implementing a message-driven system.

Furthermore, this invention requires no restriction on the component relationship. The relationship could include a tree, graph, or network.

In summary, the present invention discloses a method, apparatus, and article of manufacture for tracking and propagating state changes in a message-driven computer program. In accordance with the present invention, a program in the memory of a computer receives a notification signal indicating that an event has occurred and transitions a first component from a current state to a new state based on the notification signal, wherein the states are represented by discrete objects or components. The computer program propagates, to a second component subordinate to a first component representing the new state, a signal indicating the new state of the first component.

What is claimed is:

1. A computer-implemented method for propagating state changes in a message-driven computer program comprising:
    (a) receiving, in a computer, a first notification signal indicating that an event has occurred;
    (b) transitioning a first component of an application program executing in the computer from a current state to a new state in response to the first notification sign;
    (c) evaluating the state of a third component of the application program to determine if the transition of the first component to the new state should be propagated to a second component of the application program, wherein the second component is dependent on the first component;
    (d) delaying propagating a second notification signal that indicates the state transition from the first component to the second component until the state of the third component indicates that the propagation should occur; and
    (e) propagating the second notification signal from the first component to the second component by setting a flag in the second component, wherein the flag represents the state of the first component.

2. The method of claim 1 further comprising storing, in a queue, the second notification signal propagated to the second component.

3. The method of claim 1 wherein the event is an input/output event received into the computer.

4. The method of claim 1 wherein the state of the first component is represented by a discrete object that is mapped to the event.

5. An apparatus for propagating state changes in a message-driven computer program, wherein the computer program is comprised of a plurality of interdependent components, comprising:

(a) a computer having a memory;

(b) means, performed by the computer, for receiving a first notification signal indicating that an event has occurred;

(c) means, performed by the computer, for transitioning a first component from a current state to a new state in response to the first notification signal;

(d) means, performed by the computer, for evaluating the state of a third component to determine if the transition of the first component to the new state should be propagated to a second component, wherein the second component is dependent of the first component;

(e) means, performed by the computer, for delaying propagating a second notification signal that indicates the state transition from the first component to the second component until the state of the third component indicates that the propagation should occur; and (f) means, performed by the computer, for propagating the second notification signal from the first component to the second component by setting a flag in the second component, wherein the flag represents the state of the first component.

6. The apparatus of claim 5, further comprising means, performed by the computer, for storing in a queue, in the memory of the computer, the second notification signal propagated to the second component.

7. The apparatus of claim 5, wherein the event is an input/output event received into the computer.

8. The apparatus of claim 5, wherein the state of the first component is represented by a discrete object that is mapped to the event.

9. A program storage device, readable by a computer having a memory and coupled to a data storage device, tangibly embodying one or more programs of instructions executable by the computer to perform a method of propagating state changes in a message-driven computer program executed by the computer, wherein the computer program is comprised of a plurality of interdependent components, the method comprising:

(a) receiving, in the memory of the computer, a first notification signal indicating that an event has occurred;

(b) transitioning, in the memory of the computer, a first component from a current state to a new state in response to the first notification signal;

(c) evaluating, in the memory of the computer, the state of a third component to determine if the transition of the first component to the new state should be propagated to a second component, wherein the second component is dependent on the first component;

(d) delaying, in the memory of the computer, propagating a second notification signal that indicates the state transition from the first component to the second component until the state of the third component indicates that the propagation should occur; and (e) propagating, in the memory of the computer, the second notification signal from the first component to the second component by setting a flag in the second component, wherein the flag represents the state of the first component.

10. The program storage device of claim 9, the method further comprising storing in a queue, in the memory of the computer, the second notification signal propagated to the second component.

11. The program storage device of claim 9 wherein the event is an input/output event.

12. The program storage device of claim 9, wherein the state of the first component is represented by a discrete object that is mapped to the event.

* * * * *

UNITED STATES PATENT AND TRADEMARK OFFICE
CERTIFICATE OF CORRECTION

PATENT NO.     : 6,817,019 B1
DATED          : November 9, 2004
INVENTOR(S)    : I-Shin Andy Wang et al.

It is certified that error appears in the above-identified patent and that said Letters Patent is hereby corrected as shown below:

Column 4,
Line 40, "sign" should read -- signal --.

Signed and Sealed this

Fifteenth Day of March, 2005

JON W. DUDAS
*Director of the United States Patent and Trademark Office*